US 9,267,614 B2

(12) United States Patent
Yamada et al.

(10) Patent No.: US 9,267,614 B2
(45) Date of Patent: Feb. 23, 2016

(54) EXTERNAL SEAL STRUCTURE OF VACUUM VALVE

(71) Applicant: CKD CORPORATION, Komaki-shi, Aichi (JP)

(72) Inventors: Yoshiyuki Yamada, Komaki (JP); Shunsuke Umezawa, Kasugai (JP)

(73) Assignee: CKD CORPORATION, Komaki-shi (JP)

( * ) Notice: Subject to any disclaimer, the term of this patent is extended or adjusted under 35 U.S.C. 154(b) by 49 days.

(21) Appl. No.: 14/330,049

(22) Filed: Jul. 14, 2014

(65) Prior Publication Data

US 2015/0028245 A1   Jan. 29, 2015

(30) Foreign Application Priority Data

Jul. 24, 2013   (JP) ................................. 2013-153590

(51) Int. Cl.
| | |
|---|---|
| *F16K 51/02* | (2006.01) |
| *F16K 27/02* | (2006.01) |
| *F16K 1/46* | (2006.01) |
| *F16K 31/126* | (2006.01) |

(52) U.S. Cl.
CPC . *F16K 51/02* (2013.01); *F16K 1/46* (2013.01); *F16K 27/02* (2013.01); *F16K 31/126* (2013.01)

(58) Field of Classification Search
CPC ............ F16K 1/46; F16K 27/02; F16K 51/02
USPC ......................................................... 137/312
See application file for complete search history.

(56) References Cited

U.S. PATENT DOCUMENTS 4,874,007 A * 10/1989 Taylor ..................... G01L 19/12
                                                            137/312
5,170,659 A * 12/1992 Kemp .................... F16L 23/167
                                                            137/312

(Continued)

FOREIGN PATENT DOCUMENTS

JP      A-2010-121752      6/2010

OTHER PUBLICATIONS

Sep. 1, 2015 Office Action issued in Japanese Application No. 2013-153590.

*Primary Examiner* — Eric Keasel
(74) *Attorney, Agent, or Firm* — Oliff PLC

(57) ABSTRACT

An external seal structure in a vacuum valve in which an upper end plate of a partition wall member is held between a valve body and a cylinder cover. An annular seal member for main fluid is placed between the upper end plate and the valve body to prevent material gas from leaking to atmosphere through an abutting section defined by the valve body and the cylinder cover connected in abutting manner. The main-fluid annular seal member is made of perfluoroelastomer. A fluorinated annular seal member made of fluorinated resin is placed between the upper end plate and the valve body and between the main-fluid annular seal member and the abutting section. A leak port communicated with outside air is provided in the valve body to communicate with between a seal point of the main-fluid annular seal member and a seal point of the fluorinated annular seal member.

6 Claims, 9 Drawing Sheets

(56) References Cited

U.S. PATENT DOCUMENTS

| | | | | |
|---|---|---|---|---|
| 5,178,363 A * | 1/1993 | Icenhower | F16K 5/0285 | 137/246.22 |
| 5,190,264 A * | 3/1993 | Boger | F16K 41/04 | 251/214 |
| 5,607,165 A * | 3/1997 | Bredemeyer | F16J 15/406 | 277/320 |
| 6,508,268 B1 * | 1/2003 | Kouketsu | F16K 51/02 | 137/487.5 |
| 6,772,989 B2 * | 8/2004 | Enzaki | F16K 41/10 | 251/63.5 |
| 6,814,338 B2 * | 11/2004 | Kajitani | F16K 51/02 | 137/630 |
| 7,841,578 B2 * | 11/2010 | Ishigaki | F16K 51/02 | 251/335.3 |
| 7,862,002 B2 * | 1/2011 | Naitoh | F16K 51/02 | 251/335.3 |
| 8,573,560 B2 * | 11/2013 | Itafuji | H01L 21/6719 | 251/335.2 |
| 2013/0313458 A1 * | 11/2013 | Kouketsu | F16K 51/02 | 251/193 |

\* cited by examiner

EXTERNAL SEAL STRUCTURE OF VACUUM VALVE

CROSS-REFERENCE TO RELATED APPLICATIONS

This application is based upon and claims the benefit of priority from the prior Japanese Patent Application No. 2013-153590, filed Jul. 24, 2013, the entire contents of which are incorporated herein by reference.

BACKGROUND OF THE INVENTION

1. Field of the Invention

The present invention relates to an external seal structure of a vacuum valve including a valve body containing a valve part, a cylinder cover containing a drive part, and a partition wall member including an upper end plate held between the valve body and the cylinder cover, in which an annular seal member is placed between the upper end plate and the valve body to prevent external leakage of fluid.

2. Related Art

In a semiconductor manufacturing device, for example, material gas is supplied to a reaction chamber and this reaction chamber is evacuated by a vacuum pump to produce a thin film or coating on a wafer while keeping the reaction chamber in a vacuumed state. A vacuum valve is placed at an outlet of the reaction chamber to control an exhaust speed so as not to raise or kick up particles in the reaction chamber during exhaust in order to prevent adhesion of the particles to the surface of the wafer.

FIG. 11 is a cross sectional of a conventional vacuum valve 101. The vacuum valve 101 includes a valve body 104 and a cylinder cover 107 which are connected, forming an outer appearance of the vacuum valve 101. The vacuum valve 101 is configured so that a drive part 106 imparts a drive force to a valve element 102 through a drive shaft 105, thereby bringing the valve element 102 into or out of contact with a valve seat 103 to control a fluid flow. In the valve body 104, a partition wall member 108 is placed to prevent leakage of material gas toward the drive part 106.

The partition wall member 108 has a bellows 108a and an upper end plate 108b connected to an upper end of the bellows 108a. This partition wall member 108 is further provided with a thick wall portion 108c protruding toward the cylinder cover 107 (upward in FIG. 11) from an outer edge of an end face of the upper end plate 108b facing the cylinder cover 107. The valve body 104 is provided, at its upper end in FIG. 11, with a first joint part 104a in which the upper end plate 108b is fitted. On the other hand, the cylinder cover 107 is provided, at its lower end in FIG. 11, with a second joint part 107b provided with a shoulder portion 107a in which the thick wall portion 108c is fitted. The valve body 104 and the cylinder cover 107 support the upper end plate 108b positioned in place in a radial direction through the thick wall portion 108c. Between the first joint part 104a and the upper end plate 108b, there is placed an annular seal member 109 made of fluorinated resin to prevent external leakage of the material gas (see Patent Document 1, for example).

The above vacuum valve 101 is subjected to a leak test to detect leakage of the annular seal member 109 after product assembling, after circuit mounting, during maintenance of the semiconductor manufacturing device, and others. This leak test is generally conducted in such a manner that the internal pressure of the vacuum valve 101 is reduced to a background value and then an operator sprays fluid used for a test ("test fluid") to a joint section between the valve body 104 and the cylinder cover 107. A leak test device senses an amount of the test fluid in the vacuum valve 101 (i.e., measures a leak measurement value) and detects leakage of the test fluid through the annular seal member 109. It should be noted that helium gas (He gas) is generally used as the test fluid. This He gas is so small in molecular diameter as to easily get into a leaking area, so that even leakage of a small amount of fluid can be detected.

In the leak test, in a case where the leak measurement value continues to decrease until a predetermined detection time is elapsed from start of spraying of He gas, which indicates that the He gas does not leak from the annular seal member 109, the annular seal member 109 is not determined to be abnormal. On the other hand, in a case where the leak measurement value increases within the predetermined detection time, which indicates that the He gas leaks from the annular seal member 109, the annular seal member 109 is determined to be abnormal. According to this leak test, the leakage of the annular seal member 109 can be inspected without disassembling the vacuum valve 101.

RELATED ART DOCUMENTS

Patent Documents

Patent Document 1: JP-A-2010-121752

SUMMARY OF INVENTION

Problems to be Solved by the Invention

Meanwhile, as the material gas, highly corrosive special gas has been recently used. This special gas penetrates through the annular seal member 109 made of fluorinated resin. The inventors therefore found that external leakage of the special gas could be prevented by the use of a seal member made of perfluoroelastomer having high corrosion resistance instead of the annular seal member 109 (hereinafter, an annular seal member made of perfluoroelastomer is referred to as an "annular seal member $109x$" to distinguish from the annular seal member 109 made of fluorinated resin).

The inventors subjected the vacuum valve 101 using the annular seal member $109x$ to a leak test and found that a leak measurement value increased within a predetermined detection time. The inventors thus disassembled this vacuum valve 101 to check the annular seal member $109x$, but did not find any abnormality in the seal member $109x$. That is, in the leak test, the vacuum valve 101 using the annular seal member $109x$ was erroneously determined to have an abnormality in the seal member $109x$.

The present invention has been made to solve the above problems and has a purpose to provide an external seal structure of a vacuum valve, capable of preventing false detection of the abnormality of an annular seal member made of perfluoroelastomer in a leak test.

Means of Solving the Problems

To achieve the above purpose, one aspect of the invention provides an external seal structure in a vacuum valve including: a valve body containing a valve part to control a fluid flowing in a flow passage; a cylinder cover connected to the valve body in abutting manner, the cylinder cover containing a drive part to give a drive force to the valve part; and a partition wall member including an upper end plate held between the valve body and the cylinder cover, the partition wall member being internally provided in the valve body to be extensible/contractible to separate between the drive part and the flow passage, the external seal structure including an annular seal member for main fluid placed between the upper end plate and the valve body to prevent the fluid flowing in the flow passage from leaking to atmosphere through an abutting section defined by the vale body and the cylinder cover connected in abutting manner, wherein the annular seal member for main fluid is made of perfluoroelastomer, a fluorinated annular seal member made of fluorinated resin is placed in a position between the upper end plate and the valve body and between the annular seal member for main fluid and the abutting section, and the valve body is provided with a leak port communicated with atmosphere, the leak port being communicated with between a seal point of the annular seal member for main fluid and a seal point of the fluorinated annular seal member.

Effects of the Invention

According to the seal structure of the above vacuum valve, when an annular seal member made of perfluoroelastomer and used for main fluid is to be subjected to a leak test, it is possible to prevent false detection of abnormality of the seal member.

DESCRIPTION OF EMBODIMENTS

A detailed description of a preferred embodiment of a seal structure of a vacuum valve embodying the present invention will now be given referring to the accompanying drawings.

First Embodiment

Figure 1:
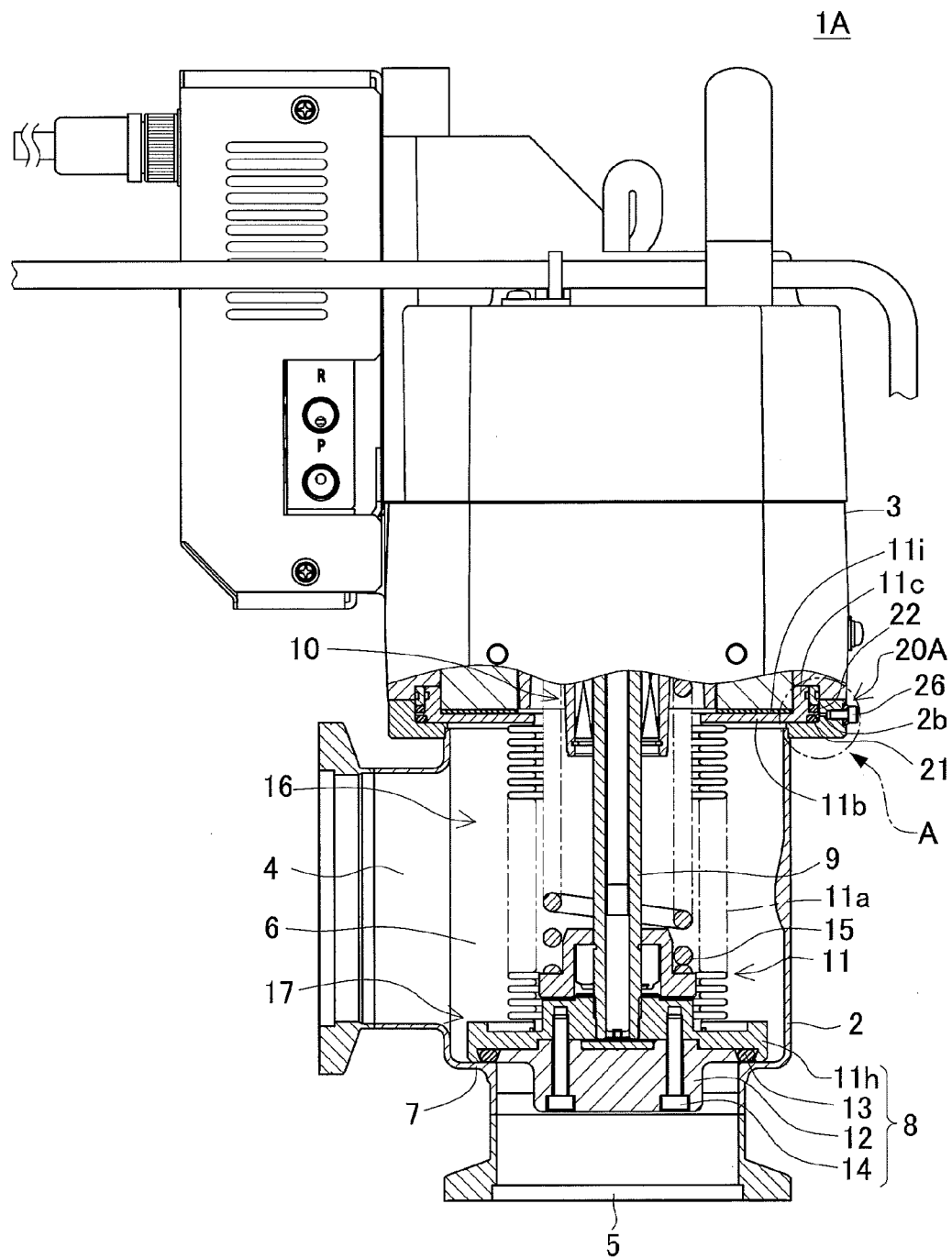
FIG. 1 is a cross sectional view of a vacuum valve in which an external seal structure of a first embodiment according to the invention is applied, showing a valve closed state.
Figure 2:
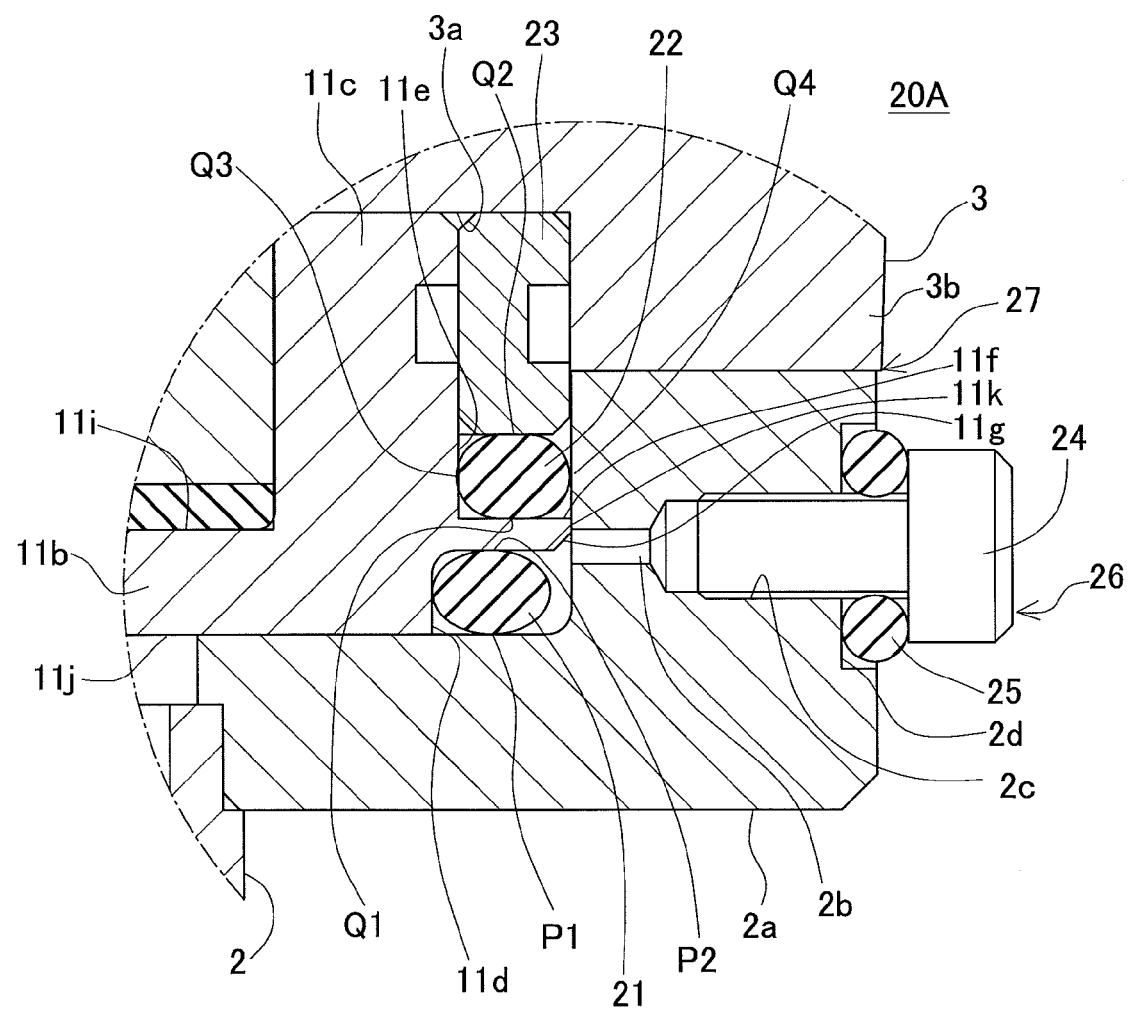
FIG. 2 is an enlarged cross sectional view of a part A in FIG. 1.
Figure 3:
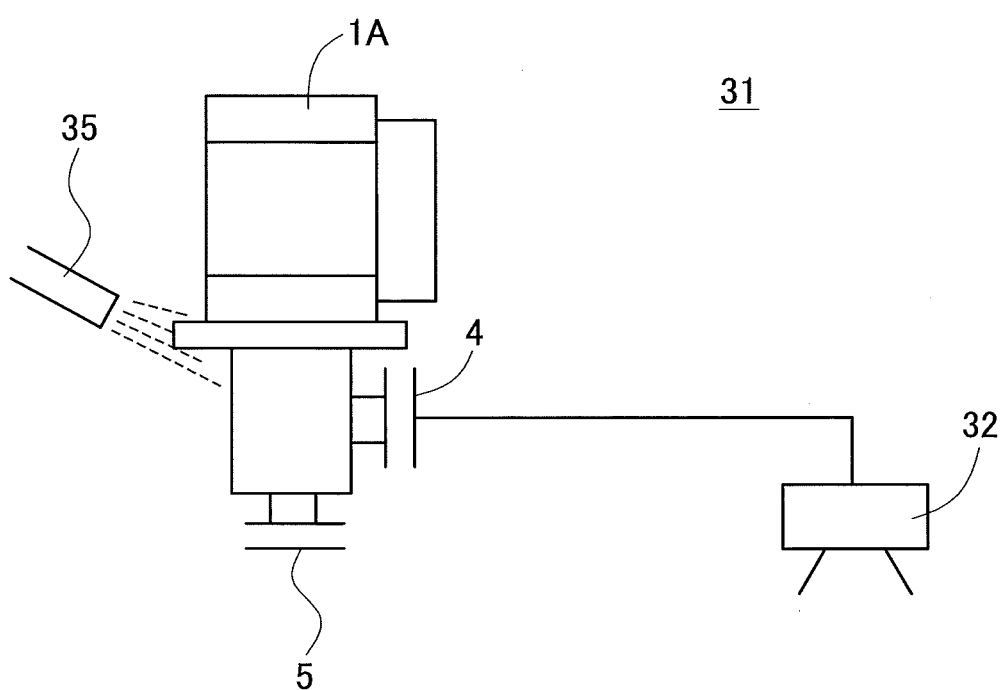
FIG. 3 is a schematic configuration view of a leak test device.

FIG. 1 is a cross sectional view of a vacuum valve 1A in which an external seal structure 20A of a first embodiment is applied, showing a valve closed state. FIG. 2 is an enlarged cross sectional view of a part A of the external seal structure 20A in FIG. 1. FIG. 3 is a schematic configuration view of a leak test device. FIGS. 4 to 7 are graphs showing examples of results of a leak test. The whole structure and operations of the vacuum valve 1A will be briefly explained first and then the structure of the external seal structure 20A will be explained in detail. The leak test and results thereof and the operations and effects of the external seal structure 20A will be described in turn.

A. Whole Structure and Operations of Vacuum Valve 1A

The vacuum valve 1A in FIG. 1 is placed for example between a treatment chamber (not shown) of a semiconductor manufacturing device and a vacuum pump (not shown) to control an exhaust flow rate of material gas to be exhausted from the treatment chamber. The vacuum valve 1A has an external appearance defined by a valve body 2 and a cylinder cover 3 connected to each other. For a joint section between the valve body 2 and the cylinder cover 3, the external seal structure 20A is provided to prevent external leakage of the material gas.

The valve body 2 internally contains a valve part 17 to control a flow rate of the material gas to be allowed to flow in a flow passage 16. This flow passage 16 is formed by a first port 4 and a second port 5 communicated with each other through an internal space 6. The valve part 17 includes a valve seat 7 provided in an inner wall of the valve body 2 at which the second port 5 opens in the internal space 6, and a valve element 8 moveable to come into or out of contact with the valve seat 7. The valve element 8 is coupled to a drive part 10 through a drive shaft 9. The drive part 10 is housed in the cylinder cover 3 and configured to impart a drive force to the valve part 17.

A partition wall member 11 is provided in the valve body 2 so as to be extensible and contractible and to separate between the drive part 10 and the flow passage 16. The partition wall member 11 includes an upper end plate 11b and a lower end plate 11h which are respectively connected to an upper end and a lower end of a bellows 11a by welding or another technique and are radially outwardly extended from the bellows 11a. The lower end plate 11h is fixed to a fixing member 12 through an O ring 13 with bolts 14, forming a valve element 8. The upper end plate 11b is provided with a thick wall portion 11c protruding toward the cylinder cover 3 from an outer edge of a first end face 11i (an upper surface in FIG. 2) of the upper end plate 11b facing to the cylinder cover 3. The thick wall portion 11c has a rectangular shape in axial cross section. While the valve body 2 and the cylinder cover 3 are positioned in place in a radial direction of the vacuum valve 1A through the thick wall portion 11c, the valve body 2 and the cylinder cover 3 retain the upper end plate 11b. Of the partition wall member 11, the bellows 11a freely extends and contracts axially according to the operation of the valve element 8. A compression spring 15 is placed inside the partition wall member 11 to bias the valve element 8 toward the valve seat 7.

In the vacuum valve 1A configured as above, the first port 4 is coupled to a treatment chamber (not shown) of a semiconductor manufacturing device and the second port 5 is coupled to a vacuum pump (not shown). The vacuum valve 1A is arranged such that the valve element 8 is biased by the compressed spring 15 to come in contact with the valve seat 7 while the drive part 10 is not driven, thereby closing off a flow between the first port 4 and the second port 5 and not controlling a flow rate of the material gas to be exhausted from the treatment chamber. On the other hand, when the drive part 10 imparts a drive force to the valve element 8, the valve element 8 is moved upward according to a balance between the drive force of the drive part 10 and the spring force of the compression spring 15, thereby allowing fluid communication between the first port 4 and the second port 5. Accordingly, the vacuum valve 1A exhausts the material gas from the treatment chamber with a flow rate according to a valve opening degree.

B. External Seal Structure 20A of Vacuum Valve 1A

As shown in FIG. 2, a first joint part 2a of the valve body 2 is connected in abutting manner to a second joint part 3b of the cylinder cover 3. Herein, abutting portions of the first joint part 2a of the valve body 2 and the second joint part 3b of the cylinder cover 3 are referred to as an "abutting section" 27. The external seal structure 20A is configured such that an annular seal member 21 for main fluid (material gas) (hereinafter, also referred to as a "first seal member") made of perfluoroelastomer to prevent leakage of a main fluid and a fluorinated annular seal member 22 (hereinafter, also referred to as a "second seal member") made of fluorinated resin are placed between the upper end plate 11b of the partition wall member 11 and the first joint part 2a of the valve body 2. Specifically, the external seal structure 20A doubly seals the joint section between the valve body 2 and the cylinder cover 3.

The first joint part 2a has an axial cross sectional shape bent at a right angle and contacts with a second end face 11j (a lower surface in FIG. 2) of the upper end plate 11b facing to the valve body 2 and an outer peripheral surface 11k of the thick wall portion 11c. The first seal member 21 is placed between the first joint part 2a and the upper end plate 11b. The second seal member 22 is placed in a position between the first joint part 2a of the valve body 2 and the upper end plate 11b and between the first seal member 21 and the abutting section 27. In other words, the second seal member 22 is arranged axially outside than the first seal member 21 with respect to the flow passage 6. The leak port 2b is formed to open in the surface of the first joint part 2a and communicate with ambient air (atmosphere). Further, the leak port 2b is provided to communicate with between the first seal member 21 and the second seal member 22.

To be concrete, the upper end plate 11b is formed with a first mounting groove 11d along an outer edge of the second end face 11j to receive the first seal member 21. The upper end plate 11b is further formed with a second mounting groove 11e along an outer peripheral surface of the thick wall portion 11c to receive the second seal member 22. The upper end plate 11b is further formed with a wall portion 11f between the first mounting groove 11d and the second mounting groove 11e.

The first seal member 21 is compressed in a direction (in an up-down direction in FIG. 2) of holding or clamping the upper end plate 11b between the valve body 2 and the cylinder cover 3, thus coming into close contact with the first joint part 2a and the wall portion 11f to seal at two points (seal points) P1 and P2 as shown in FIG. 2. Accordingly, the material gas flowing from the flow passage 16 into between the first joint part 2a and the upper end plate 11b does not leak out from the first seal member 21.

On the other hand, the second seal member 22 is compressed between a shoulder portion 3a of the cylinder cover 3 and the wall portion 11f of the upper end plate 11b through a pressure ring 23 and is positioned on a side closer to the valve body 2 than the abutting section 27 at which the valve body 2 (the first joint part 2a) and the cylinder cover 3 (a second joint part 3b) abut on each other. The second seal member 22 is placed in close contact with the wall portion 11f and the pressure ring 23 to seal at two points (seal points) Q1 and Q2 as shown in FIG. 2 and also placed in close contact with an inner wall of the second mounting groove 11e and an inner wall of the first joint part 2a to seal at radial inside and outside positions (seal points) Q3 and Q4. Accordingly, a fluid used for a test ("test fluid") getting into the valve 1A through the abutting section 27 between the valve body 2 (the first joint part 2a) and the cylinder cover 3 (the second joint part 3b) does not leak from the second seal member 22 toward the first seal member 21.

Since the second seal member 22 seals as above, the test fluid cannot be supplied to the first seal member 21 in a leak test and thus leakage of the first seal member 21 cannot be detected. Therefore, the leak port 2b is formed in the first joint part 2a so as to open at a position more outside in an axial direction (i.e., on a side away from the flow passage 16) than the seal points P1 and P2 of the first seal member 21 and more inside (i.e., on a side closer to the passage 16) than the seal points Q1 to Q4 of the second seal member 22. The leak port 2b is formed in a linear shape extending radially inward from the outer peripheral surface of the first joint part 2a to communicate with the first mounting groove 11d. The wall portion 11f is formed with a guide surface 11g obliquely extending from the outer peripheral surface 11k of the thick wall portion 11c toward the first mounting groove 11d in order to allow the test fluid to smoothly flow toward the first seal member 21.

In case the leak port 2b is opened except during the leak test, particles and others may enter the vacuum valve 1A through the leak port 2b. Therefore, the external seal structure 20A is provided with a closing unit 26 to close the leak port 2b and to be freely detachable in the first joint part 2a. The closing unit 26 is configured such that a closing bolt 24 is threadedly inserted in a female screw hole 2c formed in an opening of the leak port 2b communicated with the outside air (atmospheric air), and a seal member 25 is compressed between the outer peripheral surface of the first joint part 2a and the head portion of the bolt 24, thus sealing and closing the opening of the leak port 2b. The first joint part 2a is formed with a recess 2d along the outer edge of the opening of a female screw hole 2c to reduce the outward protruding amount of the closing bolt 24.

C. Leak Test and Results

FIG. 3 is a schematic configuration view of a leak test device 31. This device 31 is provided with a spraying probe 35 for spraying a fluid (herein, He gas) used for a test ("test fluid"). In a leak test, the leak test device 31 is arranged to connect a leak detector 32 to the first port 4 of the vacuum valve 1A which is a test object. The second port 5 of the vacuum valve 1A is hermetically closed with a seal member.

In the leak test, the closing unit 26 is detached from the vacuum valve 1A in a valve closed state and then the leak detector 32 is driven. The leak detector 32 starts to reduce the internal pressure of the internal space 6 (see FIG. 1) of the vacuum valve 1A. When the leak detector 32 detects that the internal pressure of the vacuum valve 1A is decreased to a background value, the detector 32 informs an operator that spraying of He gas is enabled by an indicator lamp or the like. Accordingly, the operator sprays the He gas with the probe 35 to the whole periphery of the external seal structure 20A. The leak detector 32 is not zero point reset even after spraying of He gas is started. The leak detector 32 senses the amount of He gas and detects gas leakage from the start of spraying of He gas until a predetermined detection time is elapsed. After termination of the leak test, the leak port 2b is closed by the closing unit 26 and then the vacuum valve 1A is detached from the leak test device 31.

The results of the above leak test are explained below. Even when a first seal member 21 having no scratches or cracks is normally placed in the vacuum valve 1A, if the second seal member 22 is not mounted or the second seal member 22 has scratches or cracks, the leak measurement value increases after start of He-gas spraying and before a lapse of the predetermined detection time, as shown in FIG. 7.

Figure 4:
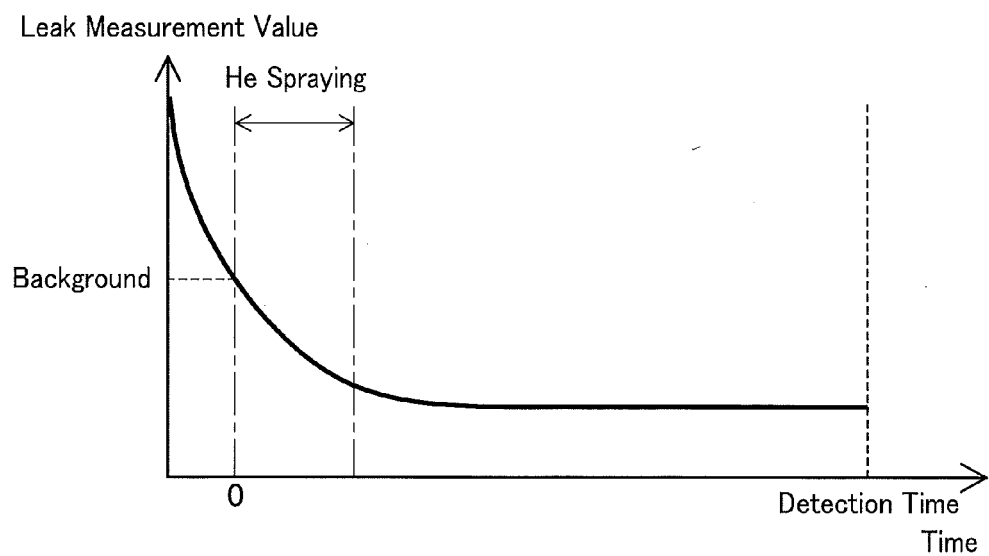
FIG. 4 is a graph showing one example of results of a leak test, corresponding to a normal condition.

In contrast, when a first seal member 21 and a second seal member 22, both having no scratches or cracks, are normally mounted in the vacuum valve 1A, the leak measurement value continuously decreases for a period from start of He-gas spraying until the predetermined detection time is elapsed, as shown in FIG. 4.

Figure 7:
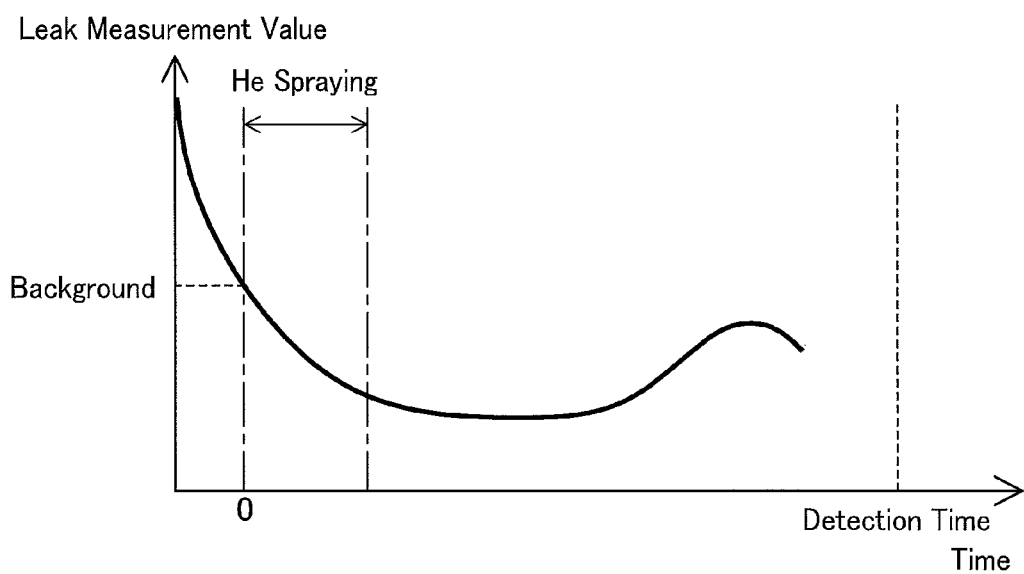
FIG. 7 is a graph showing another example of results of the leak test in which no annular seal member for main fluid is mounted or an annular seal member for main fluid is detected to have scratches or cracks.

The results shown in FIGS. 4 and 7 reveal that the first seal member 21 can prevent leakage of highly corrosive material gas, whereas the first seal member 21 may be erroneously detected to be abnormal during the leak test if the first seal member 21 is used alone. This is conceivably because the He gas entering through the abutting section 27 of the first and second joint parts 2a and 3b and the He gas flowing in the leak port 2b join together, resulting in excessive supply to the first seal member 21. Furthermore, the results shown in FIGS. 4 and 7 show that the first seal member 21 is not erroneously detected to be abnormal when the second seal member 22 is placed in a position between the first seal member 21 and the abutting section 27. This is conceivably because only the He gas flowing in the leak port 2b is supplied to the first seal member 21 in the leak test and thus the amount of He gas penetrating through the first seal member 21 is small.

Figure 5:
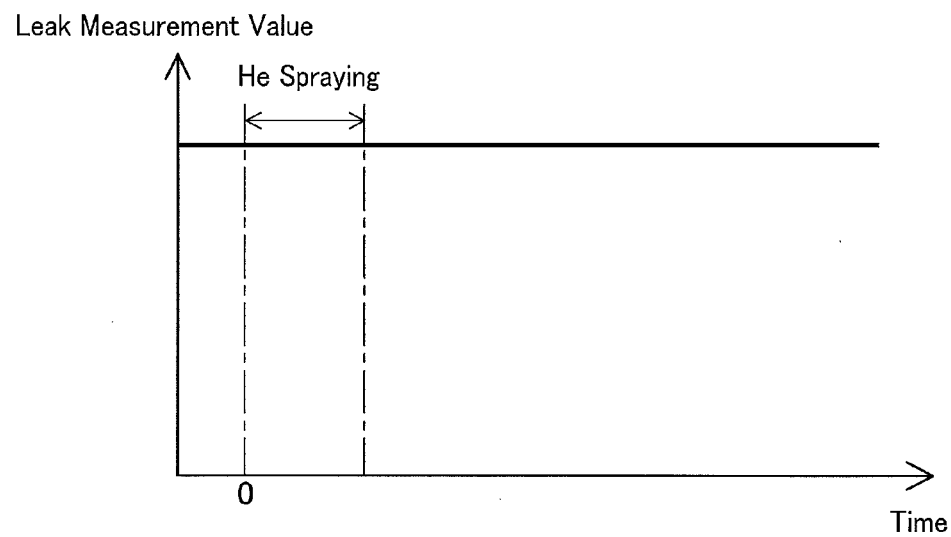
FIG. 5 is a graph showing another example of results of the leak test in which no annular seal member for main fluid is mounted.

On the other hand, even when the unscratched second seal member 22 is normally mounted in the vacuum valve 1A, unless the first seal member 21 is mounted in the first mounting groove 11d, the leak measurement value does not decrease as shown in FIG. 5. This is because the He gas flows from the leak port 2b to the internal space 6 through the first mounting groove 11d and thus the internal pressure of the internal space 6 is not decreased.

Figure 6:
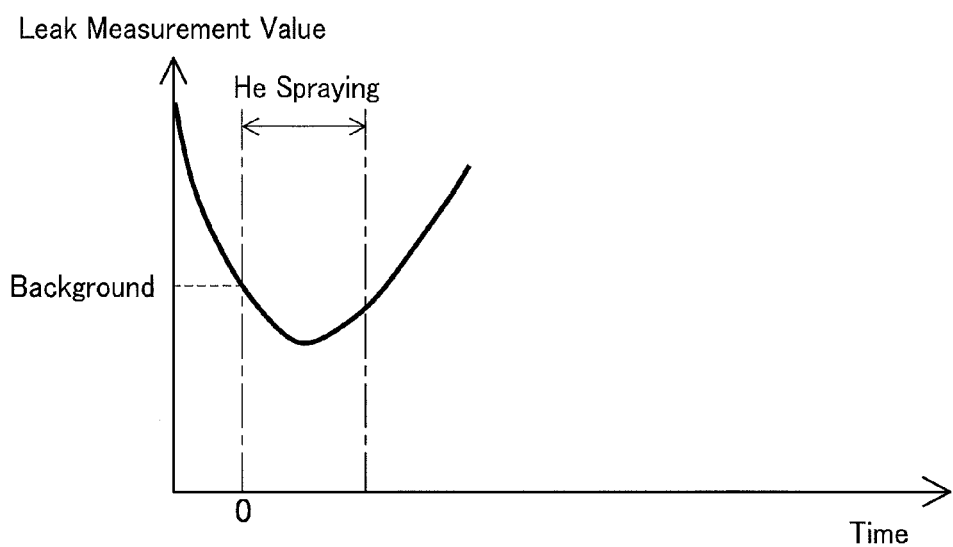
FIG. 6 is a graph showing another example of results of the leak test in which an annular seal member for main fluid is detected to have scratches or cracks.

Furthermore, even when the unscratched second seal member 22 is normally mounted in the vacuum valve 1A, if the scratched first seal member 21 is mounted, the leak measurement value starts to increase immediately after the He gas is sprayed to the external seal structure 20A as shown in FIG. 6. This is because the He gas supplied to the first mounting groove 11d leaks to the flow passage 16 through the scratched first seal member 21.

According to the external seal structure 20A, therefore, even the first seal member 21 allowing penetration of He gas tends to change a leak measurement value during the leak test using He gas as shown in FIGS. 4, 5, and 6, so that it is possible to detect whether or not the first seal member 21 is mounted and whether or not the first seal member 21 is scratched or cracked, even without disassembling the external seal structure 20A.

D. Operations and Effects of External Seal Structure 20A in Vacuum Valve 1A of First Embodiment As explained above, the external seal structure 20A in the first embodiment is applied to the vacuum valve 1A including the valve body 2 containing the valve part 17 to control the material gas flowing in the flow passage 16, the cylinder cover 3 connected to the valve body 2 in abutting manner, the cover 3 containing the drive part 10 to impart a drive force to the valve part 17, and the partition wall member 11 including the upper end plate 11b held between the valve body 2 and the cylinder cover 3 and internally placed in the valve body 2 so as to be extensible and contractible and to separate between the drive part 10 and the flow passage 16. In the external seal structure 20A, the annular seal member for main fluid (the first seal member) 21 is placed between the upper end plate 11b and the valve body 2 to prevent leakage of the material gas (main fluid) flowing in the flow passage 16 to atmosphere through the abutting section 27 defined by the valve body 2 and the cylinder cover 3 connected to each other in abutting manner. The first seal member 21 is made of perfluoroelastomer. The fluorinated annular seal member (the second seal member) 22 is placed in a position between the upper end plate 11b and the valve body 2 and between the first seal member 21 and the abutting section 27. The leak port 2b communicated with atmosphere is provided in the valve body 2 to communicate with, i.e., to open, between the seal points P1 and P1 of the first seal member 21 and the seal points Q1 to Q4 of the second seal member 22.

The above external seal structure 20A can prevent leakage of the material gas to the outside by use of the first seal member 21 even when the vacuum valve 1A is operated to control an exhaust flow rate of highly corrosive material gas. However, if the first seal member 21 made of perfluoroelastomer is provided alone, He gas sprayed to the external seal structure 20A during the leak test penetrates through the first seal member 21 and thus the first seal member 21 is likely to be erroneously detected to be abnormal.

In the external seal structure 20A, in contrast, the second seal member 22 that does not allow penetration of the He gas is placed axially outside than the first seal member 21 (on an atmospheric side, i.e., on a side close to the abutting section 27) with respect to the flow passage 16. During the leak test, accordingly, the He gas entering through the abutting section 27 of the first and second joint parts 2a and 3b is blocked off by the second seal member 22, and thus is not supplied to the first seal member 21. The He gas is supplied to the first seal member 21 through the leak port 2b only. Accordingly, the external seal structure 20A enables reducing the amount of He gas leaking from the first seal member 21 during leak test. Thus, the first seal member 21 is not erroneously determined to be abnormal.

According to the external seal structure 20A of the first embodiment, consequently, it is possible to avoid erroneous detection of the abnormality of the first seal member 21 made of perfluoroelastomer in the leak test.

In the external seal structure 20A of the first embodiment, the closing unit 26 for closing the leak port 2b is detachably attached to the valve body 2. This makes it possible to prevent particles or the like from entering in the vacuum valve 1A except during the leak test.

In the external seal structure 20A in the first embodiment, the upper end plate 11b is provided with the thick wall portion 11c protruding along the outer edge of the first end face 11i facing to the cylinder cover 3, and the valve body 2 includes the first joint part 2a contacting with the second end face 11j of the upper end plate 11b facing to the valve body 2 and the outer circumferential surface 11k of the thick wall portion 11c. The annular seal member 21 for main fluid is placed between the first joint part 2a and the wall portion 11f of the upper end plate 11b to seal at upper and lower points in the holding direction (up-down direction in FIG. 2) of holding the upper end plate 11b between the valve body 2 and the cylinder cover 3. The fluorinated annular seal member 22 is placed between the inner wall of the second mounting groove 11e and the inner surface of the first joint part 2a to seal at upper and lower points in the holding direction (the up-down direction in FIG. 2) and seal at inside and outside points in the radial direction of the vacuum valve 1A. The above configuration can prevent leakage of He gas even when the leak port 2b is simply formed from the outer side surface of the first joint part 2a in the radial direction of the vacuum valve 1A.

Second Embodiment

Figure 8:
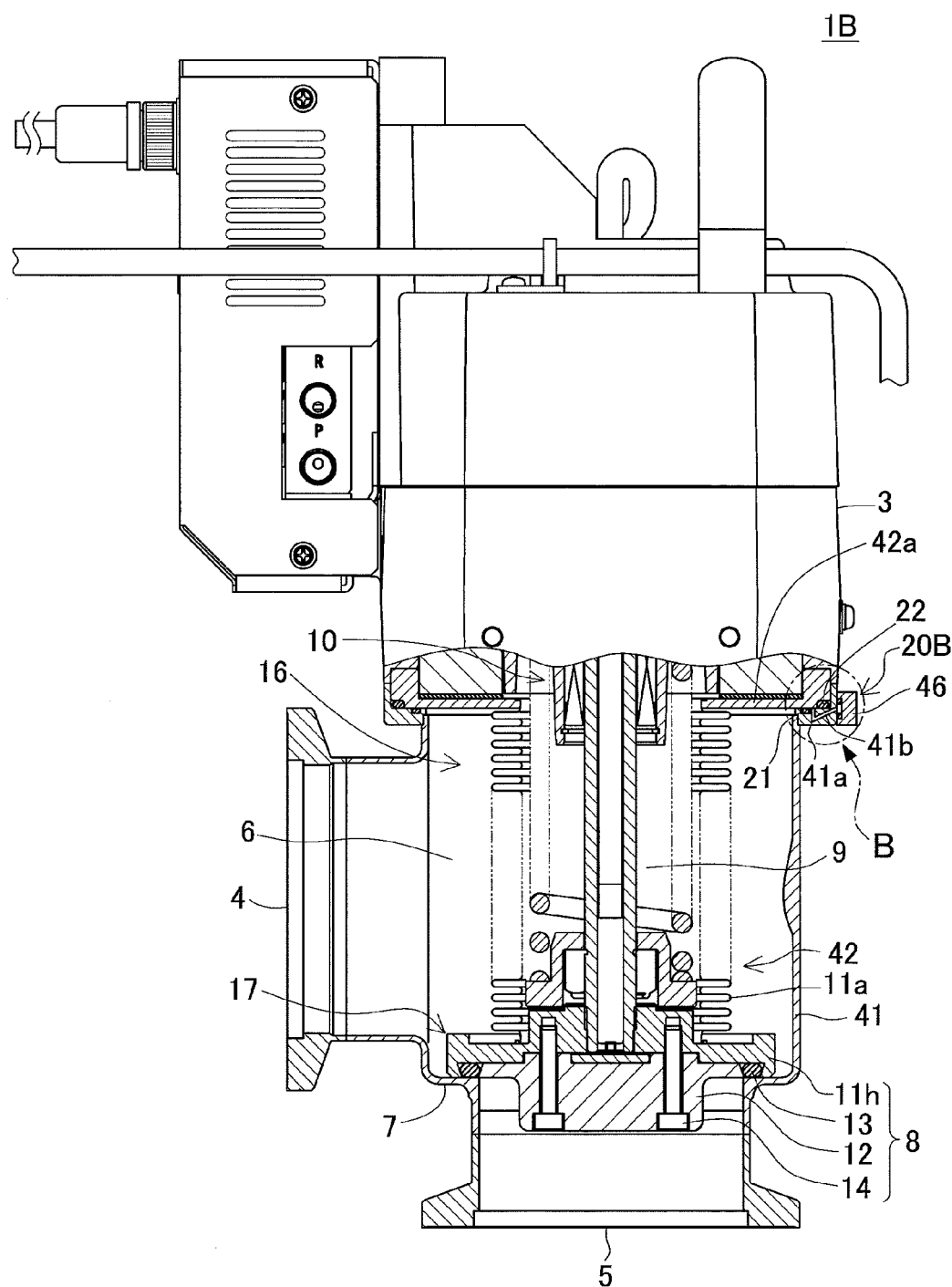
FIG. 8 is a partial cross sectional view of a vacuum valve in which an external seal structure of a second embodiment according to the invention is applied.
Figure 9:
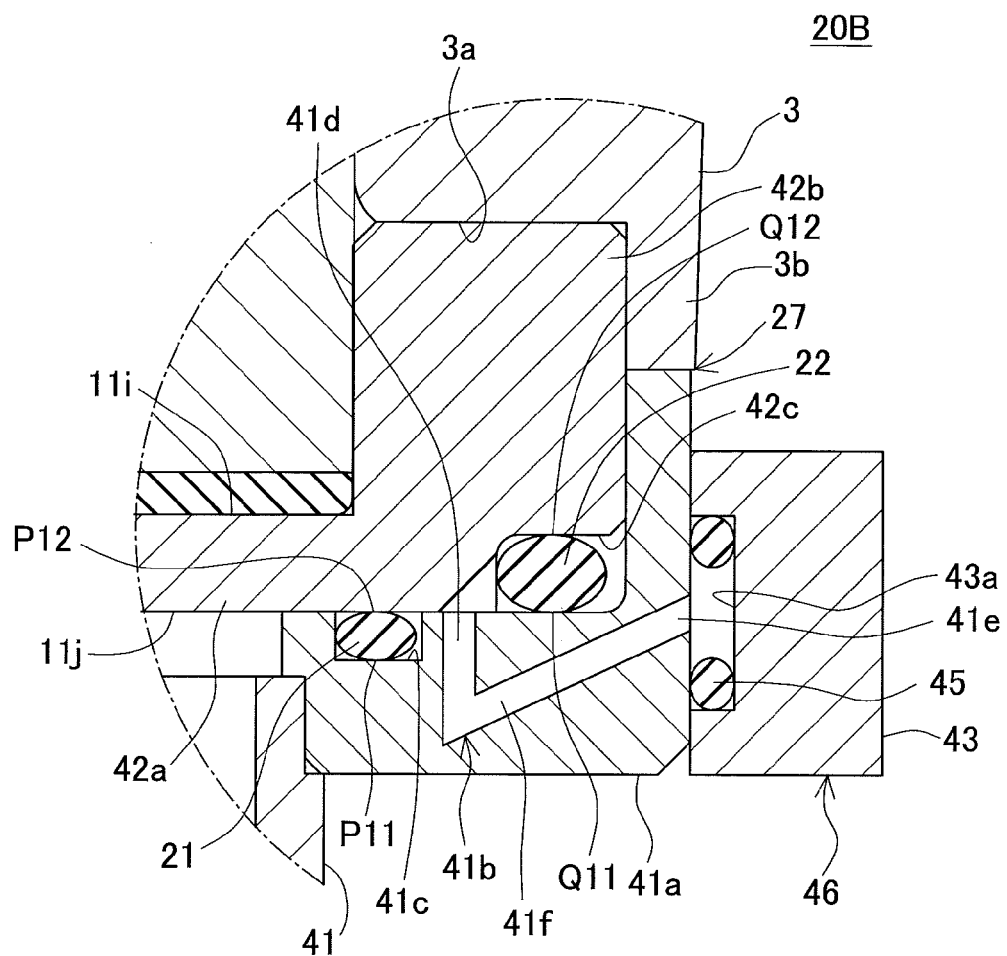
FIG. 9 is an enlarged cross sectional view of a part B in FIG. 8.
Figure 10:
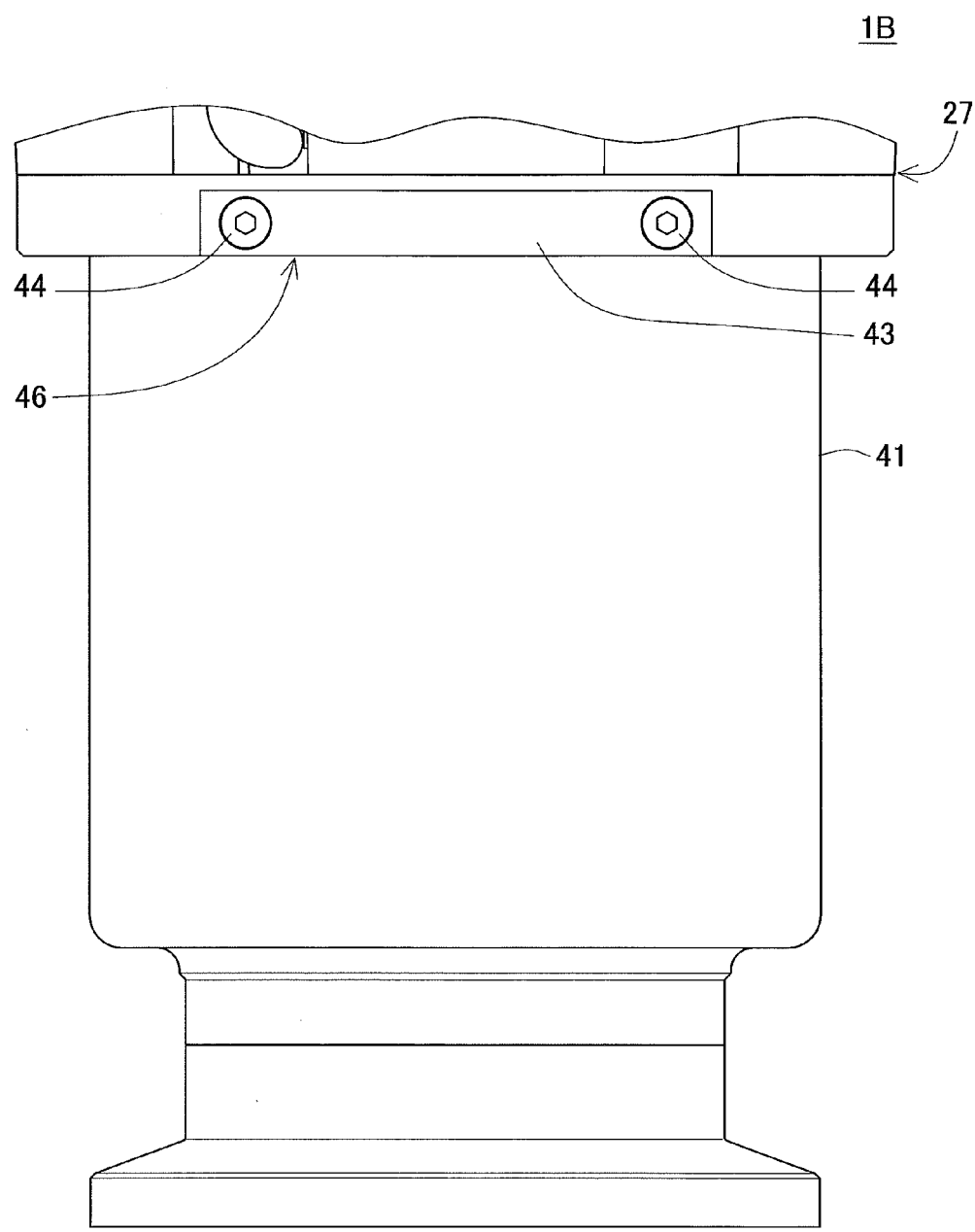
FIG. 10 is a side view of an external seal structure shown in FIG. 8.
Figure 11:
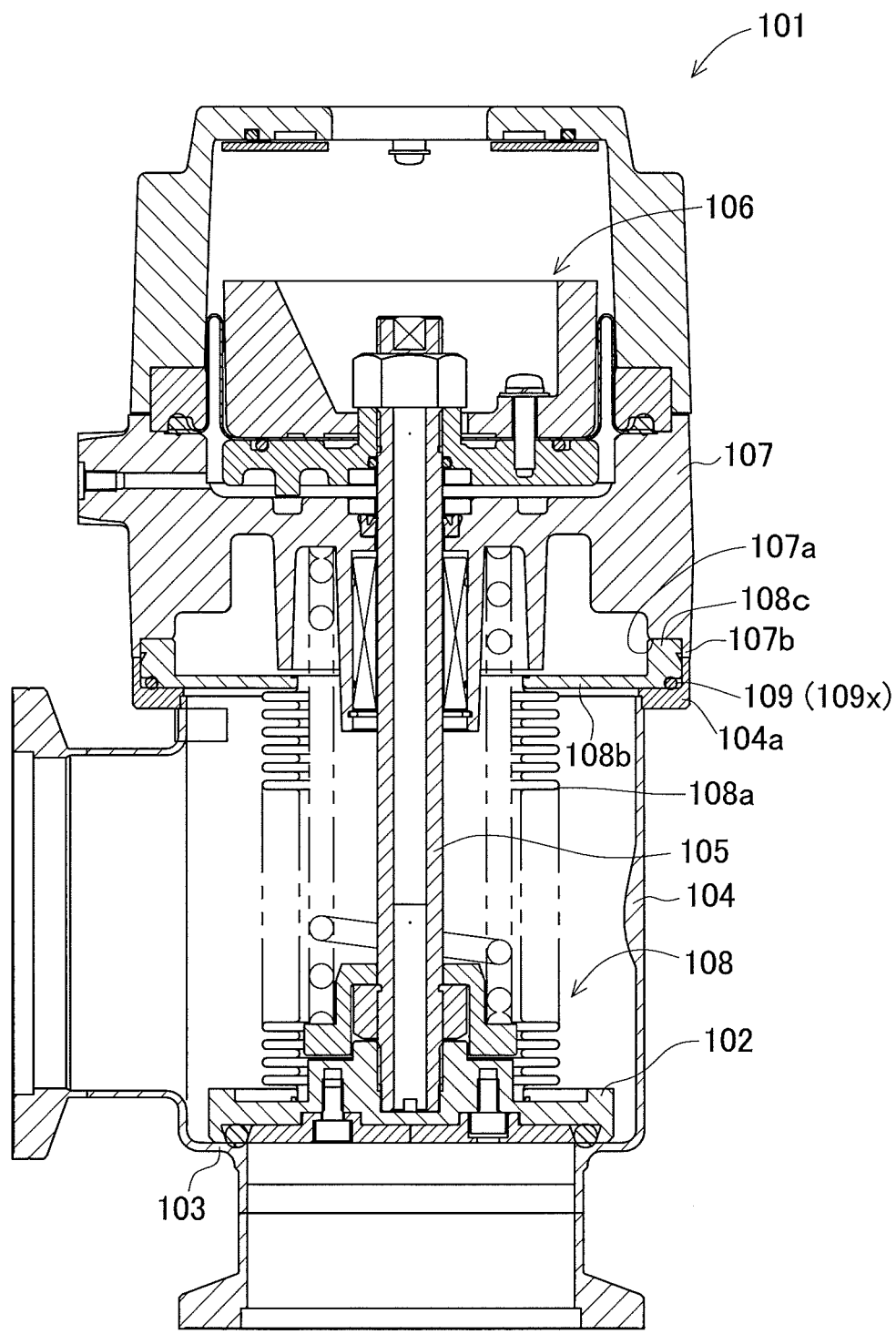
FIG. 11 is a cross sectional view of a conventional vacuum valve, showing a valve closed state.

An external seal structure of a vacuum valve in a second embodiment according to the invention will be explained below, referring to the accompanying drawings. FIG. 8 is a partial cross sectional view of a vacuum valve 1B to which an external seal structure 20B of the second embodiment is applied, showing a valve closing state. FIG. 9 is an enlarged cross sectional view of a part B in FIG. 8. FIG. 10 is a side view of the external seal structure 20B.

The external seal structure 20B in the second embodiment shown in FIG. 8 is applied to the vacuum valve 1B. The external seal structure 20B is mainly different from the external seal structure 20A of the first embodiment in the positions of the main-fluid annular seal member (the first seal member) 21 and the fluorinated annular seal member (the second seal member) 22, the shape of a leak port 41b, and the configuration of a closing unit 46. The following explanations will be given to the differences from the first embodiment. Like parts or components to those in the first embodiment are assigned the same reference signs as those in the first embodiment and their explanations are appropriately omitted.

As shown in FIG. 9, the external seal structure 20B is configured such that the first seal member 21 and the second seal member 22 are placed between a second end face 11j of an upper end plate 42a and a first joint part 41a of a valve body 41.

As shown in FIG. 8, the valve body 41 has a similar configuration to the valve body 2 of the first embodiment except that a leak port 41b and a first mounting groove 41c are formed in the first joint part 41a. A partition wall member 42 is provided similar to the partition wall member 11 of the first embodiment except the upper end plate 42a.

The first joint part 41a is formed, in a surface facing the upper end plate 42a, with an annular first mounting groove 41c to receive the first seal member 21, as shown in FIG. 9. The first seal member 21 is compressed in a holding direction (up-down direction in FIG. 9) of holding or clamping the upper end plate 42a by the valve body 41 and the cylinder cover 3, thereby sealing in close contact with the inner wall of the first mounting groove 41c and the second end face 11j of the upper end plate 42a, at two points (seal points) P11 and P12, as shown in FIG. 9.

On the other hand, the second seal member 22 is mounted in a second mounting groove 42c formed in the upper end plate 42a and placed in a position between the upper end plate 42a and the valve body 41 and between the first seal member 21 and the abutting section 27. The upper end plate 42a is provided with a thick wall portion 42b protruding vertically and extending annularly along the outer edge of the first end face 11i and is formed with the second mounting groove 42c annularly extending along the outer edge of the second end face 11j. The second seal member 22 is compressed in a holding direction (up-down direction in FIG. 9) of holding the upper end plate 42a by the valve body 41 and the cylinder cover 3, thereby sealing in close contact with the first joint part 41a and the inner wall of the second mounting groove 42c, at two points (seal points) Q11 and Q12, as shown in FIG. 9.

The first joint part 41a is internally formed with a V-shaped leak port 41b. This leak port 41b has a first opening 41d that opens between the seal points P11, P12 of the first seal member 21 and the seal points Q11, Q12 of the second seal member 22, and a second opening 41e that opens in the outer peripheral surface of the first joint part 41a so that the first opening 41d and the second opening 41e are communicated with each other through a V-shaped passage 41f. Accordingly, during the leak test, the He gas sprayed to the outer peripheral surface of the external seal structure 20B is easily supplied to the first seal member 21 through the leak port 41b.

In the external seal structure 20B, the closing unit 46 that closes the leak port 41b is detachably attached to the first joint part 41a. This closing unit 46 includes a closing cover 43 fixed to the first joint part 41a with bolts 44 to cover the second opening 41e of the leak port 41b, as shown in FIG. 10. The closing cover 43 has a circular arc shape along the shape of the outer peripheral surface of the first joint part 41a and is formed with a recess 43a in the surface facing the first joint part 41a as shown in FIG. 9. In the closing cover 43, an annular seal member 45 is mounted along the side walls of the recess 43a. The thus configured closing unit 46 compresses the annular seal member 45 between the outer peripheral surface of the first joint part 41a and the bottom wall of the recess 43a in a fastening direction of the fixing bolts 44 to seal.

The above external seal structure 20B is applied to the vacuum valve 1B including the valve body 41 containing the valve part 17 to control a material gas flowing in the passage 16, the cylinder cover 3 connected to the valve body 41 in abutting manner, the cylinder cover 3 containing the drive part 10 to give a drive force to the valve part 17, and the partition wall member 42 including the upper end plate 42a held between the valve body 41 and the cylinder cover 3 and being internally provided in the valve body 41 to be extensible/contractible to separate between the drive part 10 and the flow passage 16. The first seal member 21 is placed between the upper end plate 42a and the valve body 41 to prevent the material gas flowing in the flow passage 16 from leaking to atmosphere through the abutting section 27. In this external seal structure 20B in the vacuum valve 1B, the first seal member 21 is made of perfluoroelastomer, the second seal member 22 made of fluorinated resin is placed in a position between the upper end plate 42a and the valve body 41 and between the first seal member 21 and the abutting section 27, and the leak port 41b communicated with atmosphere is provided in the valve body 41 so as to communicate with, i.e., to open, between the seal points P11, P12 of the first seal member 21 and the seal points Q11, Q12 of the second seal member 22.

Since the external seal structure 20B includes the first seal member 21 made of perfluoroelastomer between the upper end plate 42a and the first joint part 41a, even if the vacuum valve 1B is to be used to control highly corrosive special gas, this special gas is not allowed to leak from the first seal member 21.

On the other hand, in the external seal structure 20B, the closing unit 46 is detached from the first joint part 41a when the leak test is to be performed, thereby opening the leak port 41b. In the leak test, when He gas is sprayed to the outer peripheral surface of the external seal structure 20B, the He gas flows in the second mounting groove 42c through the abutting section 27 at which the first joint part 41a of the valve body 41 and the second joint part 3b of the cylinder cover 3 abut on each other. However the He gas is not allowed to flow toward the first seal member 21 beyond the seal points Q11, Q12 of the second seal member 22 mounted in the second mounting groove 42c. Thus, only the He gas having flowed in the leak port 41b is supplied to the first seal member 21. This results in a reduced amount of He gas penetrating through the first seal member 21. The first seal member 21 is not erroneously detected to be abnormal in the leak test.

In the external seal structure 20B of the second embodiment, the second seal member 22 is sealed at two, upper and lower, seal points Q11 and Q12 in FIG. 9, and thus the external seal structure 20B can be easily assembled.

The present invention is not limited to the above embodiments and may be embodied in other specific forms without departing from the essential characteristics thereof.

In the above embodiment, for instance, the vacuum valves 1A and 1B are each installed in a semiconductor manufacturing device. It is, however, of course possible to install the vacuum valves 1A and 1B in other devices.

Instead of the closing unit 26 of the first embodiment, the closing unit 46 of the second embodiment may be applied to the vacuum valve 1A.

In the second embodiment, the leak port 41b is formed in a V shape. As an alternative, it may be formed in a linear shape extending from the lower surface of the first joint part 41a in FIG. 9.

REFERENCE SIGNS LIST 1A, 1B Vacuum valve
2 Valve body
2a, 41a First joint part
2b, 41b Leak port
3 Cylinder cover
10 Drive part
11, 42 Partition wall member
11b, 42a Upper end plate
11c, 42b Thick wall portion
21 Annular seal member for main fluid (First seal member)
22 Fluorinated annular seal member (Second seal member)
20A, 20B External seal structure
26, 46 Closing unit
P1, P2, P11, P12, Q1, Q2, Q3, Q4, Q11, Q12 Seal point

The invention claimed is:

1. An external seal structure in a vacuum valve including: a valve body containing a valve part to control a fluid flowing in a flow passage; a cylinder cover connected to the valve body in abutting manner, the cylinder cover containing a drive part to give a drive force to the valve part; and a partition wall member including an upper end plate held between the valve body and the cylinder cover, the partition wall member being extensible and contractible and being internally provided in the valve body between the drive part and the flow passage to separate the drive part from the flow passage, the external seal structure including an annular seal member for main fluid placed between the upper end plate and the valve body to prevent the fluid flowing in the flow passage from leaking to atmosphere through an abutting section defined by the valve body and the cylinder cover connected in abutting manner,
wherein the annular seal member for main fluid is made of perfluoroelastomer,
a fluorinated annular seal member made of fluorinated resin is placed in a position between the upper end plate and the valve body and between the annular seal member for main fluid and the abutting section, and
the valve body is provided with a leak port communicated with atmosphere, the leak port being communicated with an area between a seal point of the annular seal member for main fluid and a seal point of the fluorinated annular seal member.

2. The external seal structure of a vacuum valve according to claim 1, wherein a closing unit to close the leak port is detachably attached to the valve body.

3. The external seal structure of a vacuum valve according to claim 2,
wherein the upper end plate has an end face facing to the valve body, and
the annular seal member for main fluid and the fluorinated annular seal member are placed between and in close contact with the valve body and the end face of the upper end plate to seal.

4. The external seal structure of a vacuum valve according to claim 2,
wherein the upper end plate has an end face facing to the cylinder cover and a thick wall portion protruding along an outer edge of the end face,
the valve body includes a first joint part contacting with the end face of the upper end plate facing to the valve body, the first joint part contacting with an outer peripheral surface of the thick wall portion,
the annular seal member for main fluid is placed between the first joint part and the end face of the upper end plate facing to the valve body to seal at upper and lower points in a holding direction of holding the upper end plate between the valve body and the cylinder cover, and
the fluorinated annular seal member is placed between the thick wall portion and an inner surface of the first joint part to seal at upper and lower points in the holding direction and seal at inside and outside points in a radial direction of the vacuum valve.

5. The external seal structure of a vacuum valve according to claim 1,
wherein the upper end plate has an end face facing to the valve body, and
the annular seal member for main fluid and the fluorinated annular seal member are placed between and in close contact with the valve body and the end face of the upper end plate to seal.

6. The external seal structure of a vacuum valve according to claim 1,
wherein the upper end plate has an end face facing to the cylinder cover and a thick wall portion protruding along an outer edge of the end face,
the valve body includes a first joint part contacting with the end face of the upper end plate facing to the valve body, the first joint part contacting with an outer peripheral surface of the thick wall portion,
the annular seal member for main fluid is placed between the first joint part and the end face of the upper end plate facing to the valve body to seal at upper and lower points in a holding direction of holding the upper end plate between the valve body and the cylinder cover, and
the fluorinated annular seal member is placed between the thick wall portion and an inner surface of the first joint part to seal at upper and lower points in the holding direction and seal at inside and outside points in a radial direction of the vacuum valve.

* * * * *